US012436148B2

(12) United States Patent
Freeman et al.

(10) Patent No.: US 12,436,148 B2
(45) Date of Patent: Oct. 7, 2025

(54) DIRECT IMMUNOASSAY MEASUREMENT OF AUTOANTIBODIES

(71) Applicant: Siemens Healthcare Diagnostics Inc., Tarrytown, NY (US)

(72) Inventors: James Freeman, Sandy Hook, CT (US); Mariah Arcuri, Norwood, NJ (US); Cheryl Krumm, Yonkers, NY (US); Eddine Merabet, White Plains, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 971 days.

(21) Appl. No.: 17/250,151

(22) PCT Filed: Jul. 1, 2019

(86) PCT No.: PCT/US2019/040167
§ 371 (c)(1),
(2) Date: Dec. 7, 2020

(87) PCT Pub. No.: WO2020/010009
PCT Pub. Date: Jan. 9, 2020

(65) Prior Publication Data
US 2021/0247392 A1  Aug. 12, 2021

Related U.S. Application Data

(60) Provisional application No. 62/693,439, filed on Jul. 2, 2018.

(51) Int. Cl.
*G01N 33/564* (2006.01)
*G01N 33/543* (2006.01)
*G01N 33/78* (2006.01)

(52) U.S. Cl.
CPC ..... *G01N 33/564* (2013.01); *G01N 33/54353* (2013.01); *G01N 33/78* (2013.01); *G01N 2800/24* (2013.01)

(58) Field of Classification Search
CPC ............... C07K 16/18; G01N 2800/24; G01N 33/54353; G01N 33/564; G01N 33/6854; G01N 33/78
See application file for complete search history.

(56) References Cited

U.S. PATENT DOCUMENTS

| | | | |
|---|---|---|---|
| 5,296,347 A | 3/1994 | Lamotte et al. | |
| 2011/0059552 A1* | 3/2011 | Scholz ................. | C07K 14/005 435/69.3 |
| 2011/0143454 A1* | 6/2011 | Upmeier ............ | G01N 33/5438 436/501 |
| 2013/0011860 A1 | 1/2013 | Eisenbarth et al. | |
| 2013/0149700 A1 | 6/2013 | Weber et al. | |
| 2019/0323969 A1* | 10/2019 | He ...................... | G01N 33/553 |

FOREIGN PATENT DOCUMENTS

| | | | |
|---|---|---|---|
| CN | 1515909 | | 7/2004 |
| CN | 101029894 | | 9/2007 |
| CN | 101246167 | | 8/2008 |
| CN | 101470117 | | 7/2009 |
| CN | 107044977 A | * | 8/2017 |
| EP | 0627081 | | 7/1994 |
| JP | H03-82962 | | 4/1991 |
| JP | H0572204 | | 3/1993 |
| JP | H07507143 A | | 8/1995 |
| JP | 2002533678 | | 10/2002 |
| JP | 2009510397 | | 3/2009 |
| WO | 1994015214 | | 7/1994 |
| WO | 2010056681 | | 5/2010 |
| WO | 2017087634 | | 5/2017 |
| WO | 2017/153336 | | 9/2017 |
| WO | WO 2018/000898 | * | 1/2018 |

OTHER PUBLICATIONS

Frank et al., "Bridge Technology with TSH Receptor Chimera for Sensitive Direct Detection of TSH Receptor Antibodies Causing Graves' Disease: Analytical and Clinical Evaluation," Horm. Metab. Res., 2015, vol. 47, No. 12, pp. 880-888; Epub Jun. 16, 2015.*
MSD "Bridging Immunogenicity Assays Guidelines for Assay Development," 2011, pp. 1-27.*
Natrajan et al., "Zwitterionic reagents for labeling, cross-linking and improving the performance of chemiluminescent immunoassays," Org. Biomol. Chem., 2012, vol. 10, pp. 1883-1895.*
Zhu et al., CN 107044977 A, published Aug. 15, 2017; machine translation.*
A printout "Detection Of Anti-Drug Antibody (ADA) Using Single Molecule Counting (SMC™) Technology" retrieved from 2018-17941_SMC-Technology_AppNote_MSIG_WEB.pdf (bioanalysis-zone.com) on Aug. 28, 2024.*
Miller, GraphPad Prism® Version 4.0 Step-by-Step Examples, GraphPad Software Inc., San Diego CA, 2003, pp. 1-4.*
International Search Report for PCT/US2019/040167 dated Sep. 30, 2019.
Beever, K. et al; "Highly Sensitive Assays of Autoantibodies to Thyroglobulin and to Thyroid Peroxidase"; Clinical Chemistry; vol. 35; No. 9; pp. 1949-1954; Sep. 1989.
Zheng Jiean et al:; "Encyclopedia of Pharmaceutical Clinical Operation Techniques", Publication Date: Aug. 31, 2002.
Hepatitis B virus surface antibody kit, "Chemi-Lumi" HBs antibody II, Package insert, Siemens Healthcare Diagnostics, Nov. 2021.
Thyroglobulin autoantibody kit for blood testing, "Access" thyroglobulin Anti-body II, Package insert, Beckman Coulter, May 2019.

(Continued)

*Primary Examiner* — Galina M. Yakovleva

(57) ABSTRACT

Disclosed herein are immunoassays for detecting an antibody in a biological sample from a subject and/or diagnosing an autoimmune disease in a subject. The disclosed immunoassays use a single, direct step to assess the level of antibody in a biological sample from the subject by simultaneously binding the antibody to a capture antigen (e.g. an unlabeled antigen bound to a solid support) and a labeled antigen not bound to the solid support.

9 Claims, 5 Drawing Sheets

(56) References Cited

OTHER PUBLICATIONS

Hepatitis B virus surface antibody kit, "Accuraseed" HBs antibody II, Package insert, Fujifilm, Jun. 2017.
EP Third Party Observations for EP Application 19830952.8 dated Oct. 8, 2024.

* cited by examiner

DIRECT IMMUNOASSAY MEASUREMENT OF AUTOANTIBODIES

CROSS-REFERENCE TO RELATED APPLICATION

This application claims priority of U.S. Provisional Application No. 62/693,439 filed Jul. 2, 2018, which is incorporated by reference herein in its entirety.

TECHNICAL FIELD

Disclosed herein are methods of detecting an antibody in a biological sample from a subject and methods of diagnosing an autoimmune disease in the subject.

BACKGROUND

The evaluation of antibodies, such as autoantibodies, in biological samples from subjects has been hindered by a lack of sensitivity and specificity of the reagents and the assays. Competition assays are currently used to detect autoantibodies in a biological sample from a subject. In these assays, a labeled control antibody is bound to the antigen, which may in turn be bound to a solid support, and the labeled control antibody/antigen complex is incubated with a biological sample suspected of containing autoantibodies. If autoantibodies are present in the sample, the labeled control antibody will be displaced from the labeled control antibody/antigen complex, resulting in a decrease in the signal generated from the complex. The amount of autoantibody present in the sample is inversely proportional to the decrease in signal. Such competition assays are based on the premise that the autoantibody and control antibody will compete for the same epitope on the antigen, which is not always the case. Accordingly, the competition assay format has limited utility.

Indirect binding assays, in which the antigen is bound to a solid phase, incubated with the biological sample, washed/isolated, and incubated with a labeled anti-human secondary antibody have also been developed. Such assays, however, are time consuming and require additional reagents.

SUMMARY

Disclosed herein are methods of detecting an antibody in a biological sample from a subject, the methods comprising: a) incubating the biological sample from the subject with: a solid support having an unlabeled antigen bound thereto, wherein the unlabeled antigen is specifically recognized by the antibody; and a labeled antigen, wherein the labeled antigen does not bind to the solid support and is specifically recognized by the antibody, wherein, in the presence of the antibody, a solid support/labeled antigen complex is formed; and b) detecting the solid support/labeled antigen complex, the presence of which indicates the presence of the antibody in the biological sample.

Also provided are methods of diagnosing an autoimmune disease in a subject. The methods comprise: a) incubating a biological sample from the subject with: a solid support having an unlabeled antigen bound thereto, wherein the unlabeled antigen is specifically recognized by an autoantibody from the subject; and a labeled antigen, wherein the labeled antigen does not bind to the solid support and is specifically recognized by the autoantibody, wherein, in the presence of the autoantibody, a solid support/labeled antigen complex is formed; and b) diagnosing the subject with the autoimmune disease if the solid support/labeled antigen complex is detected.

Kits comprising: 1) a solid support, an unlabeled antigen, and a labeled antigen; or 2) a solid support having an unlabeled antigen bound thereto and a labeled antigen are further disclosed herein.

BRIEF DESCRIPTION OF THE DRAWINGS

The summary, as well as the following detailed description, is further understood when read in conjunction with the appended drawings. For the purpose of illustrating the disclosed methods and kits, there are shown in the drawings exemplary embodiments of the methods and kits; however, the methods and kits are not limited to the specific embodiments disclosed. In the drawings.

DETAILED DESCRIPTION OF ILLUSTRATIVE EMBODIMENTS

Figure 1:
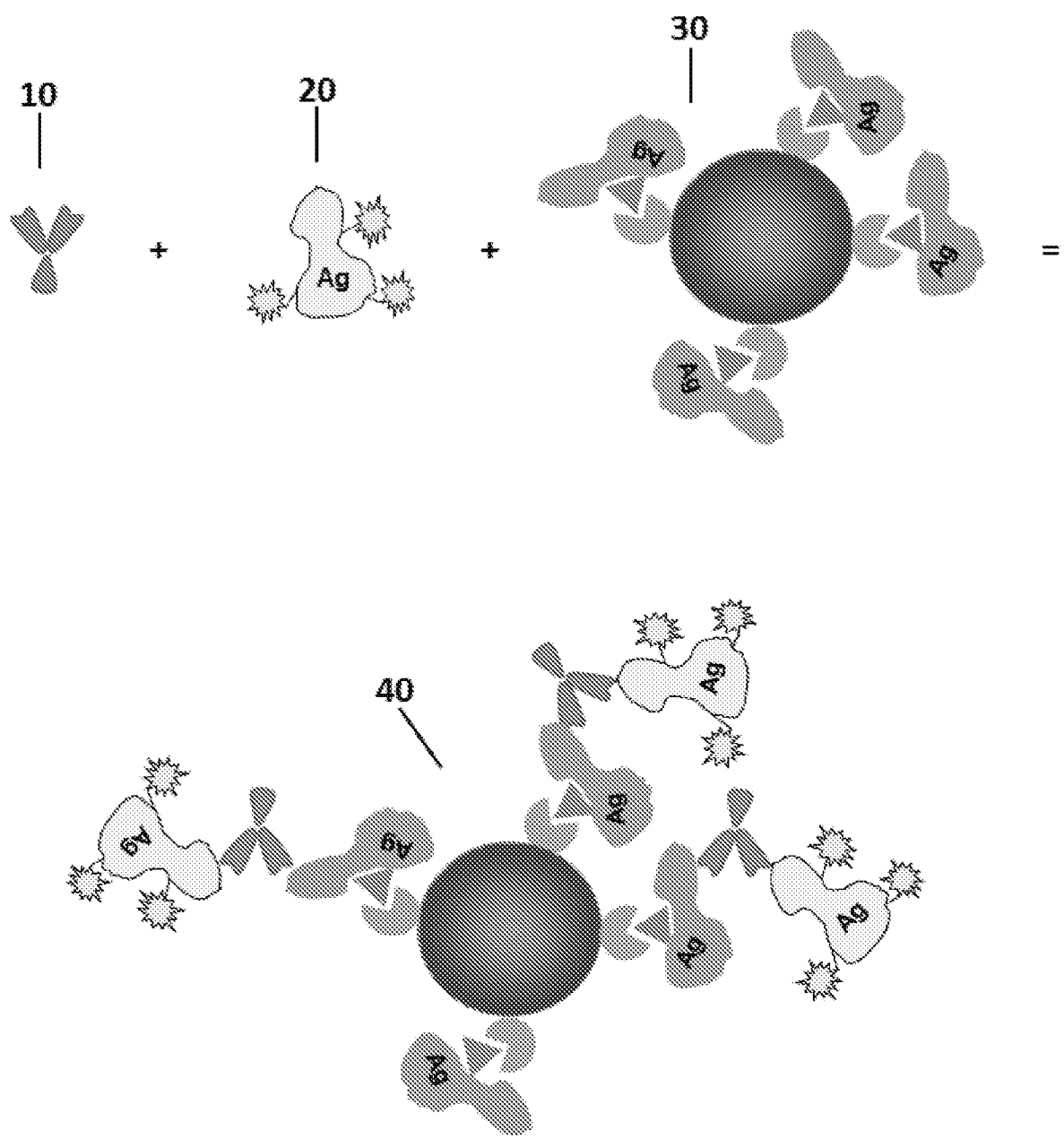
FIG. 1 illustrates an exemplary reaction scheme for the disclosed immunoassays, referred to herein as the antigen bridge immunoassay.

The disclosed methods and kits may be understood more readily by reference to the following detailed description taken in connection with the accompanying figures, which form a part of this disclosure. It is to be understood that the disclosed methods and kits are not limited to the specific methods and kits described and/or shown herein, and that the terminology used herein is for the purpose of describing particular embodiments by way of example only and is not intended to be limiting of the claimed methods and kits.

Unless specifically stated otherwise, any description as to a possible mechanism or mode of action or reason for improvement is meant to be illustrative only, and the disclosed methods and kits are not to be constrained by the correctness or incorrectness of any such suggested mechanism or mode of action or reason for improvement.

Throughout this text, the descriptions refer to methods of detecting an antibody and methods of diagnosing an autoimmune disease. Where the disclosure describes or claims a feature or embodiment associated with a method of detecting an antibody, such a feature or embodiment is equally applicable to the methods of diagnosing an autoimmune disease. Likewise, where the disclosure describes or claims a feature or embodiment associated with a method of diagnosing an autoimmune disease, such a feature or embodiment is equally applicable to the methods of detecting an antibody.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

When values are expressed as approximations, by use of the antecedent "about," it will be understood that the particular value forms another embodiment. Reference to a particular numerical value includes at least that particular value, unless the context clearly dictates otherwise.

It is to be appreciated that certain features of the disclosed methods and kits which are, for clarity, described herein in the context of separate embodiments, may also be provided in combination in a single embodiment. Conversely, various features of the disclosed methods and kits that are, for brevity, described in the context of a single embodiment, may also be provided separately or in any subcombination.

As used herein, the singular forms "a," "an," and "the" include the plural.

Various terms relating to aspects of the description are used throughout the specification and claims. Such terms are to be given their ordinary meaning in the art unless otherwise indicated. Other specifically defined terms are to be construed in a manner consistent with the definitions provided herein.

The term "comprising" is intended to include examples encompassed by the terms "consisting essentially of" and "consisting of"; similarly, the term "consisting essentially of" is intended to include examples encompassed by the term "consisting of."

Disclosed herein are immunoassays for detecting an antibody in a biological sample from a subject and/or diagnosing an autoimmune disease in a subject. The disclosed immunoassays use a single, direct step to assess the level of antibody in a sample by simultaneously binding the antibody to a capture antigen (e.g. an unlabeled antigen bound to a solid support) and a labeled antigen not bound to the solid support. Due to the bivalent nature of antibodies, the antibody present in the biological sample will simultaneously bind to the unlabeled antigen bound to the solid support and the labeled antigen, forming a complex comprising the solid support and labeled antigen. The readout from the assay (i.e. the signal from the labeled antigen linked to the solid support by the antibody) is directly proportional to the level of antibody present in the sample.

In some embodiments, immunoassays can comprise an "antigen bridge" immunoassay, an exemplary reaction scheme for which is shown in FIG. 1. A biological sample known to have, or suspected of having, an antibody of interest 10, is incubated with a labeled antigen 20 and solid support having an unlabeled antigen bound thereto 30. In the absence of the antibody, the labeled antigen will not bind to or otherwise interact with the solid support. Thus, in the absence of the antibody, the labeled antigen remains in the solution and isolation of the solid support would not result in isolation of the labeled antigen. When the antibody 10 is present in the biological sample, the antibody 10 simultaneously binds to the unlabeled antigen bound to the solid support 30 and the labeled antigen 20, thereby linking the labeled antigen 20 and the solid support 30 and resulting in the formation of a solid support/labeled antigen complex 40. It is to be understood that the order in which the incubation takes place can be different from that exemplified in FIG. 1. For example, the biological sample known to have, or suspected of having, an antibody of interest 10 can first be incubated with a solid support having an unlabeled antigen bound thereto 30 followed by incubation with a labeled antigen 20. Alternatively, the biological sample known to have, or suspected of having, an antibody of interest 10 can simultaneously be incubated with a solid support having an unlabeled antigen bound thereto 30 and a labeled antigen 20.

Figure 2:
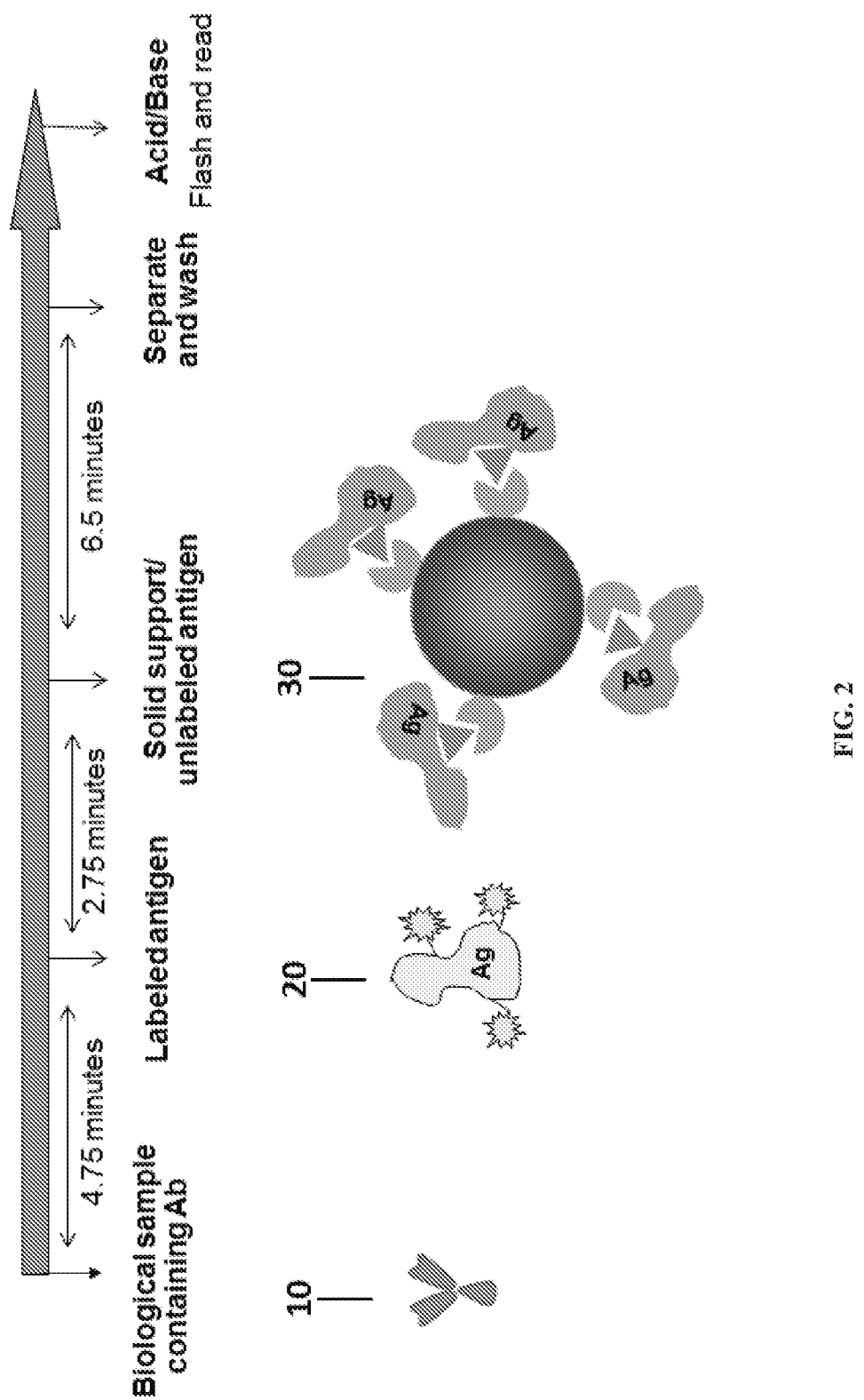
FIG. 2 illustrates an exemplary timeline for carrying out the disclosed immunoassays.

An exemplary timeline for carrying out the disclosed immunoassays is illustrated in FIG. 2. In FIG. 2, a biological sample known to have, or suspected of having, an antibody of interest 10 is incubated with a labeled antigen 20 for less than about 3 minutes. A solid support having an unlabeled antigen bound thereto 30 is added and incubated with the antibody/labeled antigen mixture for about 6.5 minutes. The solid support/labeled antigen complex 40 can then be detected (not shown).

The disclosed immunoassays include methods of detecting an antibody in a biological sample from a subject. The methods of detecting an antibody in a biological sample from a subject comprise:
  a) incubating the biological sample from the subject with:
    a solid support having an unlabeled antigen bound thereto, wherein the unlabeled antigen is specifically recognized by the antibody; and
    a labeled antigen, wherein the labeled antigen does not bind to the solid support and is specifically recognized by the antibody,
    wherein, in the presence of the antibody, a solid support/labeled antigen complex is formed; and
  b) detecting the solid support/labeled antigen complex, the presence of which indicates the presence of the antibody in the biological sample.

In some embodiments, the antibody is an autoantibody. Thus, the disclosed methods can be used to detect an autoantibody in a biological sample from the subject. An exemplary autoantibody that can be detected by the disclosed methods is an autoantibody that specifically binds thyroglobulin (i.e. anti-thyroglobulin antibody). In embodiments wherein the autoantibody specifically binds thyroglobulin, the unlabeled antigen is thyroglobulin and the labeled antigen is labeled thyroglobulin.

The disclosed immunoassays include methods of diagnosing an autoimmune disease in a subject. The methods of diagnosing an autoimmune disease in a subject comprise:
  a) incubating a biological sample from the subject with:
    a solid support having an unlabeled antigen bound thereto, wherein the unlabeled antigen is specifically recognized by an autoantibody from the subject; and
    a labeled antigen, wherein the labeled antigen does not bind to the solid support and is specifically recognized by the autoantibody,
    wherein, in the presence of the autoantibody, a solid support/labeled antigen complex is formed; and
  b) diagnosing the subject with the autoimmune disease if the solid support/labeled antigen complex is detected.

The disclosed methods can be used to diagnose any autoimmune disease in which the antigen recognized by the autoantibody is known. In some embodiments, the autoimmune disease is an autoimmune thyroid disease including Graves' disease (GD) and Hashimoto's thyroiditis (HT). In embodiments wherein the autoimmune disease is an autoimmune thyroid disease, the antigen (unlabeled and labeled) is thyroglobulin.

The below disclosure applies equally to the methods of detecting an antibody and methods of diagnosing an autoimmune disease.

Suitable biological samples include any biological sample from a subject that contains, or is suspected of containing, the antigen of interest including, but not limited to, serum, plasma, whole blood, saliva, urine, semen, perspiration, tears, and body tissues.

In some embodiments, prior to the incubating step, the biological sample from the subject can be diluted to reduce the concentration of the sample. Suitable dilutions include, for example, 1:2, 1:5, 1:10, 1:20, 1:50, 1:100, 1:1000, and so forth.

The solid support can be any material to which the unlabeled antigen can be directly or indirectly bound or linked. Exemplary solid supports include, but are not limited to, a column matrix material, a culture plate, a tube, a dish, a flask, a microtiter plate, a bead/particle, heat-killed formalin-(or other chemically)-fixed prokaryotic or eukaryotic cells, microscope slides, ACLAR® Film or any other optically transparent polymer, or a combination thereof. The solid support can be fully or partially composed of plastic, cellulose, cellulose derivatives, nitrocellulose, glass, fiberglass, latex, or a combination thereof. In some embodiments, the solid support comprises a magnetic particle. Suitable magnetic particles include paramagnetic particles (PMP) and latex magnetic particles (LMP).

The unlabeled antigen can be directly bound, or indirectly linked, to the solid support to thereby form a solid support having an unlabeled antigen bound thereto. The unlabeled antigen can be directly bound to the solid support. Suitable techniques for directly binding the unlabeled antigen to the solid support include, for example, covalent attachment, adsorption, noncovalent interaction, or combinations thereof. Alternatively, the unlabeled antigen can be indirectly linked to the solid support. Suitable means for indirectly linking the unlabeled antigen to the solid support include, for example, linking through a peptide, a protein, an antibody, a linker, or a combination thereof. In some embodiments, the unlabeled antigen can be indirectly linked to the solid support through streptavidin and biotin. For example, the unlabeled antigen can be biotinylated and the solid support can comprise streptavidin.

The solid support having unlabeled antigen bound thereto can be present in a buffer comprising one or more salts, one or more stabilizers, and one or more surfactants. In some embodiments, the buffer can comprise HEPES salt, sodium chloride, bovine albumin, bovine globulin, and Tween 20. In some embodiments, the buffer can comprise HEPES salt (16.9 g/L HEPES acid and 7.6 g/L HEPES sodium), 300 mM sodium chloride, 1% bovine albumin, 0.1% bovine globulin, and 0.2% Tween 20.

The labeled antigen does not bind to or otherwise interact with the solid support in the absence of the antibody. Thus, in embodiments wherein the solid support comprises streptavidin, the labeled antigen would not be biotinylated.

The labeled antigen comprises a detectable label. Suitable detectable labels include, but are not limited to, enzyme conjugates (e.g. horseradish peroxidase (HRP), alkaline phosphatase (AP), glucose oxidase, and β-galactosidase), fluorescent probes, radioactive isotopes, chemiluminescent and bioluminescent labels, or a combination thereof. In some embodiments, the detectable label comprises an acridinium ester or an analog thereof. Acridinium ester analogs include, but are not limited to, dimethyl acridinium ester (DMAE), N-sulfopropyl dimethyl acridinium ester (NSP-DMAE), high quantum yield acridinium ester (HQYAE), Zwitterionic acridinium ester (ZAE), hexa (ethylene) glycol acridinium ester (HEGAE), N-sulfopropyl-2-isopropoxy dimethyl acridinium ester (Iso-Di-ZAE), trisulfopropyl Acridinium Ester (TSP-AE), or N-sulfopropyl dimethyl acridinium ester with hexa (ethylene) glycol linker (HEG-GLU-AE). In some embodiments, the detectable label comprises an ruthenium ester or an analog thereof. The detectable label can be present in a 1:1 molar ratio with the antigen or can be present in a molar excess. For example, the detectable label can be present in a 5, 10, 20, or 50 molar excess.

The labeled antigen can be present in a buffer comprising one or more salts, one or more stabilizers, and one or more surfactants. In some embodiments, the buffer can comprise HEPES salt, sodium chloride, bovine albumin, bovine globulin, and Tween 20. In some embodiments, the buffer can comprise HEPES salt (16.9 g/L HEPES acid and 7.6 g/L HEPES sodium), 300 mM sodium chloride, 1% bovine albumin, 0.1% bovine globulin, and 0.2% Tween 20.

The disclosed methods can be performed faster than the indirect 2-step assays currently used, which can take on the order of about 1 hour. For example, in the disclosed methods, the biological sample known to have, or suspected of having, an antibody can be incubated in a reaction mixture for about 1 minute, about 2 minutes, about 3 minutes, about 4 minutes, about 5 minutes, or less than about 10 minutes. The labeled antigen can be added and incubated with the biological sample for about 1 minute, about 2 minutes, about 3 minutes, about 4 minutes, or less than about 5 minutes. The solid support having an unlabeled antigen bound thereto can be added to the mixture of biological sample and labeled antigen and incubated for about 1 minute, about 2 minutes, about 3 minutes, about 4 minutes, about 5 minutes, about 6 minutes, about 7 minutes, or about less than 10 minutes. In some embodiments, the incubating steps are performed in a total of about 10 minutes to about 20 minutes. The subsequent detecting or diagnosing steps can be performed in less than about 5 minutes. It is to be understood that the amount of time needed for the assay may vary based upon several factors including the level of antibody in the biological sample and the affinity of the antibody for the antigen. Thus, the disclosed methods can be performed for any suitable amount of time.

The methods can further comprise determining a level of the antibody in the biological sample of the subject. The level of the antibody in the biological sample of the subject is directly proportional to the level of the solid support/labeled antigen complex. Thus, the level of antibody can be determined by determining the level of solid support/labeled antigen complex, which can be performed, for example, by measuring the signal from the complex. Similarly, in embodiments wherein the method is used to diagnose an autoimmune disease in a subject, the solid support/labeled antigen complex is detected by measuring the signal from the labeled antigen linked to the solid support.

The disclosed methods can be performed manually or can be automated. For example, the disclosed methods can be performed using an ADVIA CENTAUR® Immunoassay System or an ATELLICA™ system.

Kits for carrying out the disclosed methods are also provided. The kits can comprise a solid support, an unlabeled antigen, and a labeled antigen. Suitable solid supports include those disclosed above. The solid supports bind to the unlabeled antigen but not the labeled antigen. Thus, in some embodiments, the kit comprises a solid support having an unlabeled antigen bound thereto and a labeled antigen. In some embodiments, the antigen is thyroglobulin and the labeled antigen is labeled thyroglobulin. Suitable labels include those disclosed above for the methods.

EXAMPLES

The following examples are provided to further describe some of the embodiments disclosed herein. The examples are intended to illustrate, not to limit, the disclosed embodiments.

Reagent Preparation

Thyroglobulin Bound Solid Phase Reagent—The assay solid phase contained streptavidin coated magnetic particles (Thermo Fisher Scientific, Dynabeads™ M270 REF 34353) coupled to biotinylated human thyroglobulin at a target particle concentration of 0.6 g/L in a buffered saline containing HEPES salt (16.9 g/L HEPES acid and 7.6 g/L HEPES sodium), 300 mM sodium chloride to provide the ionic strength, 1% bovine albumin and 0.1% bovine globulin as stabilizers, and 0.2% Tween 20.

Labeled Thyroglobulin Reagent—The assay labeled reagent contained human thyroglobulin labeled with ZAE-type acridinium ester at a thyroglobulin target concentration of 1.2 g/mL in a buffered saline containing HEPES salt (16.9 g/L HEPES acid and 7.6 g/L HEPES sodium), 300 mM sodium chloride to provide the ionic strength, 1% bovine albumin and 0.1% bovine globulin as stabilizers, and 0.2% Tween 20.

Sample Preparation

Samples (10 Levels) from WHO reference material (anti-thyroglobulin serum, human NIBSC code 65/093) were prepared according to the recommended dilution procedure. The expected concentration of anti-thyroglobulin within each sample is provided in Table 1. Similarly, patient serum standards were prepared with a highly concentrated human anti-thyroglobulin antibody (between, for example, 10,000 and 50,000 IU/mL) and diluted to make 10 levels spanning a wide concentration range (Table 2). All samples were analyzed using the disclosed immunoassay (referred to as the "antigen bridge immunoassay") and the currently used competition assay on an ADVIA CENTAUR® system.

Reaction Procedure for the Antigen Bridge Immunoassay

The following steps were performed by the ADVIA CENTAUR® system, as illustrated in FIG. 2:
  25 µL of anti-thyroglobulin antibody containing sample was dispensed into a cuvette;
  The samples were incubated for 4.75 minutes;
  Reagent Probe 1 dispensed 100 µL of labeled thyroglobulin reagent and the mixture was incubated for 2.75 minutes;
  Reagent Probe 2 dispensed 200 µL of thyroglobulin bound solid phase reagent and the mixture was incubated for 6.5 minutes at 37° C.;
  The formed complex was separated using a magnet, and the complex was aspirated and washed with a wash buffer;
  300 µL each of acid reagent (HCL) and base (NaOH) reagent were dispensed to initiate the chemiluminescent reaction; and
  Relative Luminometer Units (RLU) results were reported.

Reaction Procedure for the Competitive Immunoassay

The following steps were performed manually or using the ADVIA CENTAUR® system:
  40 µL of sample containing anti-thyroglobulin antibody was dispensed into a cuvette;
  100 µL of labeled reagent were added to the cuvette and incubated for 2.5 minutes at 37° C. The labeled reagent was prepared by mixing a human thyroglobulin (~ 0.38 µg/mL) with acridinium ester in buffer saline solution containing BSA, protein stabilizers, and preservatives;
  200 µL of solid phase were mixed in the cuvette and incubated for 5.0 minutes at 37° C. The solid phase reagent was prepared by mixing a polyclonal human anti-thyroglobulin antibody (~ 1.98 µg/mL) bound to polyclonal goat anti-human antibody (~ 49.5 µg/mL) covalently coupled to paramagnetic particles in buffer containing BSA, protein stabilizers, and preservatives;
  A magnet was then applied to separate, aspirate, and wash the cuvette with reagent water;
  300 µL each of acid reagent (HCl) and base reagent (NaOH) were dispensed to initiate the chemiluminescent reaction; and
  RLU results were reported.

Data Analysis

RLUs resulting from the reactions were determined as a function of the expected concentration in Internal Unit of antibody activity per mL (IU/mL) (Table 1 for the WHO reference samples and Table 2 for the serum patient samples). In the antigen bridge immunoassay, the signal (RLU) was directly proportional to the concentration of the autoantibody present in the sample, whereas in the competition assay the signal was indirectly proportional to the concentration of the autoantibody present in the sample.

TABLE 1

| WHO Samples | Expected Concentrations (IU/mL) | Antigen Bridge Assay RLU | Competition Assay RLU |
| --- | --- | --- | --- |
| Level 1 | 0 | 3381 | 887440 |
| Level 2 | 7.8125 | 47742 | 897444 |
| Level 3 | 15.625 | 84672 | 863750 |
| Level 4 | 31.25 | 151756 | 815643 |
| Level 5 | 62.5 | 276207 | 759089 |
| Level 6 | 125 | 486019 | 614878 |
| Level 7 | 250 | 779351 | 371528 |
| Level 8 | 500 | 918564 | 339795 |

TABLE 2

| Patient Samples | Expected Concentrations (IU/mL) | Antigen Bridge Assay RLU | Competition Assay RLU |
| --- | --- | --- | --- |
| Level 1 | 4.35 | 8122 | 700855 |
| Level 2 | 7.16 | 15445 | 649511 |
| Level 3 | 21.40 | 30262 | 638638 |
| Level 4 | 16.18 | 63240 | 564694 |
| Level 5 | 30.77 | 105924 | 502377 |
| Level 6 | 48.43 | 200597 | 395283 |
| Level 7 | 94.23 | 295594 | 308100 |
| Level 8 | 164.12 | 398975 | 221646 |

The bridge assay demonstrated a significantly higher signal relative increase compared to the signal relative decrease observed for the competition assay at low concentrations. The relative increase or decrease in signal at low concentrations has a direct impact on the detection capability of the assay. For example, the Limit of Detection (LoD), which is the lowest concentration where antibody can be detected 95% of the time, is dependent upon the detection capability of the assay. In the experiments shown above, the LoD was calculated as 1 IU/mL and 45 IU/mL for the bridge assay and competition assay, respectively. The above results demonstrate that the disclosed antigen bridge immunoassay is more sensitive than the currently used competition assay.

Optimizing the Antigen Bridge Immunoassay

Figure 3:
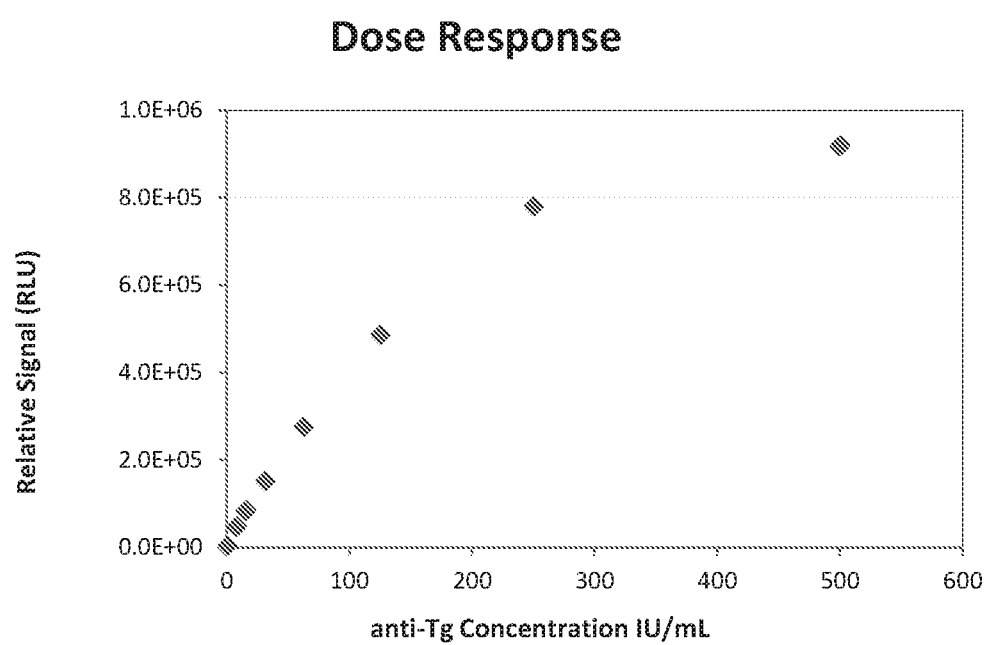
FIG. 3 illustrates an exemplary dose response curve (concentration of the anti-thyroglobulin antigen as a function of the observed signal (RLU)) for the disclosed immunoassays.
Figure 4:
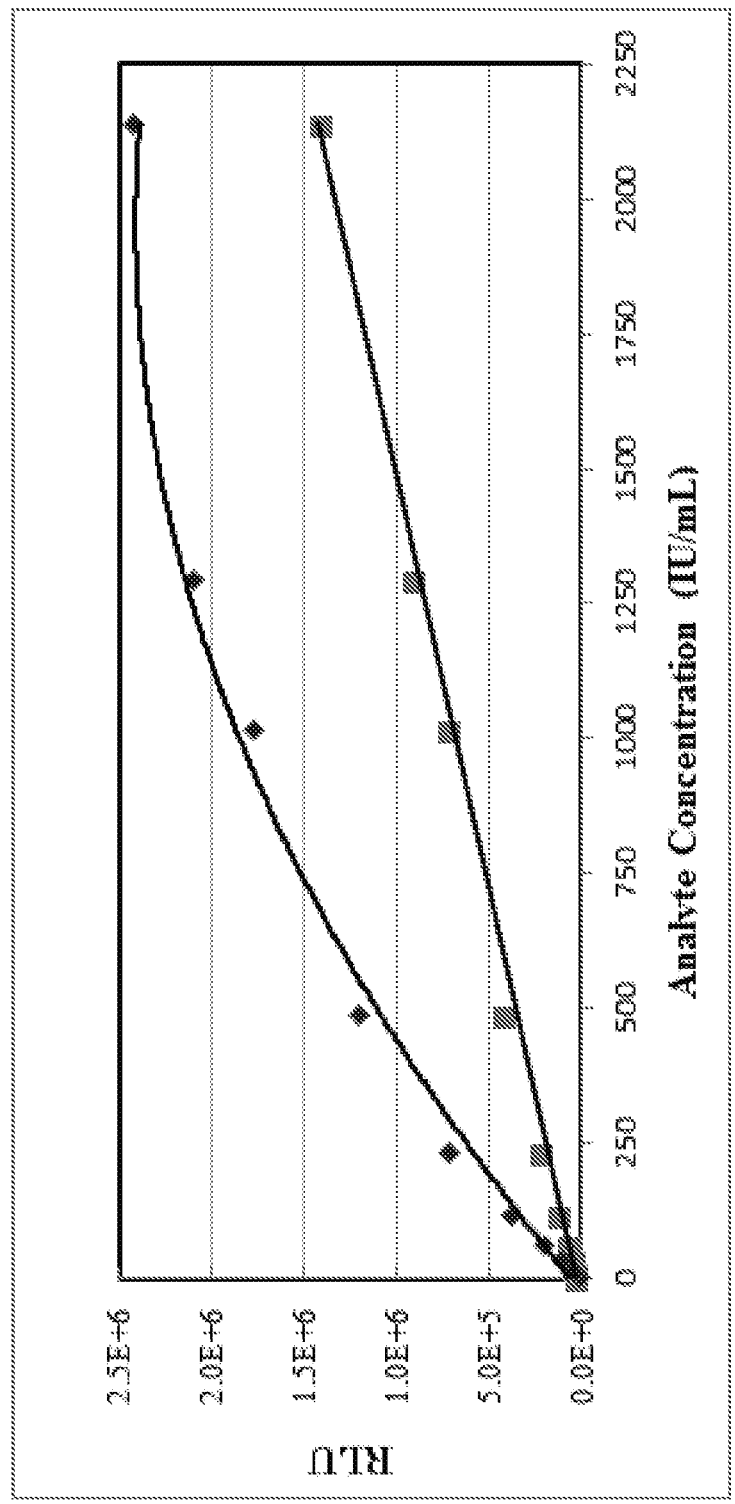
FIG. 4 illustrates an exemplary dose response curve comparing undiluted (diamond) and diluted (square) antibody samples using the disclosed immunoassays.

One potential drawback of single-step immunoassays is the "hook effect," which leads to a decrease in the detectable signal as the analyte concentration increases, leading to potential false low results. As shown in FIG. 3, for example, at lower anti-thyroglobulin antibody concentrations, the antigen bridge assay exhibits a direct relationship between the concentration of antibody and the relative signal (RLU). As the concentration of antibody increases, however, the relative signal begins to become saturated (around 500 UI/ml) in FIG. 3. In the presence of a low anti-thyroglobulin antibody concentration, a limited number of antibodies are encountered by a large number of solid support/unlabeled thyroglobulin complexes. As the concentration of antibody increases, there becomes a deficit of solid support/unlabeled thyroglobulin complexes such that only a fraction of the total amount of antibodies is bound to the solid support/unlabeled thyroglobulin complexes, and a fraction of antibody bound to the solid support/unlabeled thyroglobulin complexes cannot be completely detected. With the disclosed immunoassays, this "hook effect" can be overcome by optimizing the molar ratios of the antibody relative to the labeled and bound unlabeled thyroglobulin. As shown in FIG. 4, when the anti-thyroglobulin antibody sample was diluted (squares), the antibody measuring range was increased and a linear relationship between the signal and the antibody concentration was achieved compared to undiluted (diamond) sample.

Figure 5:
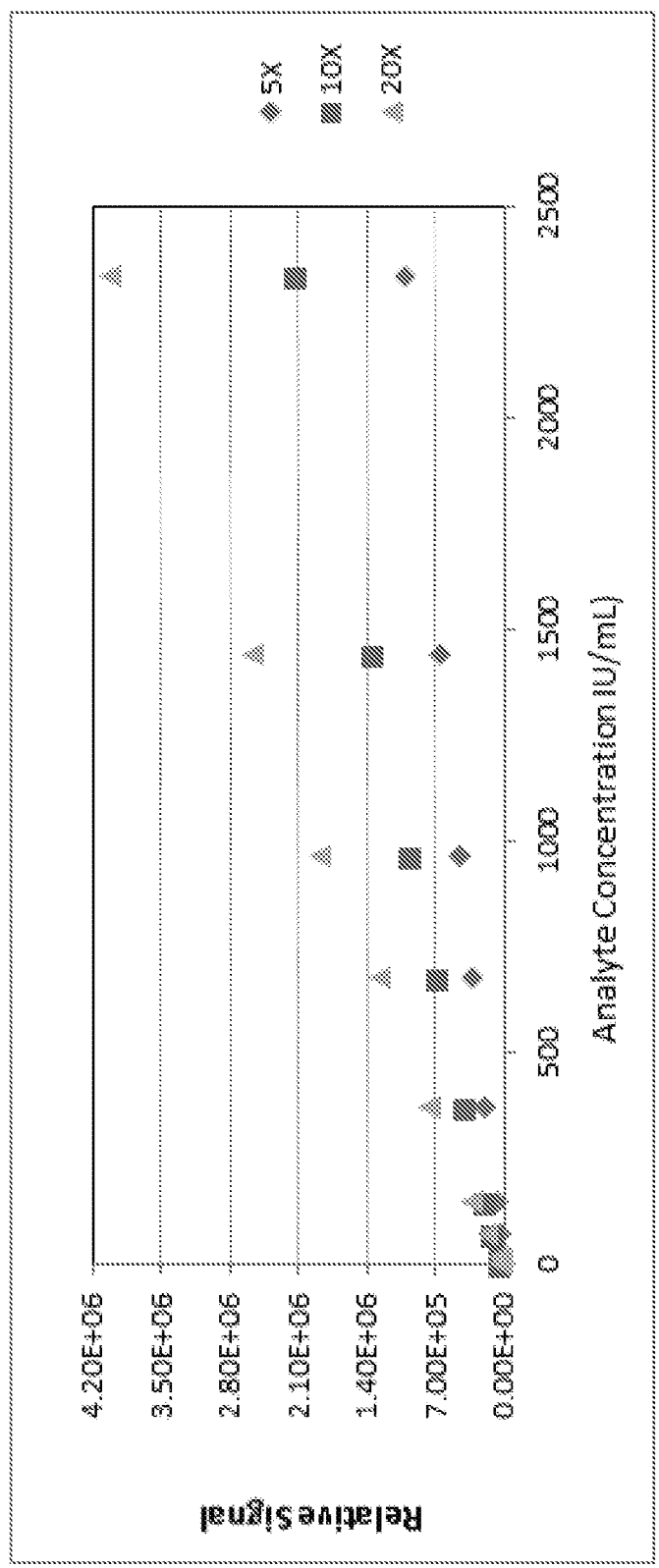
FIG. 5 illustrates an exemplary dose response curve analyzing the effect of increasing amounts of acridinium ester. Triangle=20× acridinium ester; square=10× acridinium ester; and diamond=5× acridinium ester.

To analyze the effect of label on the relative signal obtained in the immunoassay, the amount of acridinium ester added to the thyroglobulin was varied to obtain ratios of 5, 10, and 20 molar excess of the acridinium ester label. As shown in FIG. 5, higher relative signals were obtained with higher amounts of acridinium ester.

Similarly, the ratio of the anti-thyroglobulin antibody to the solid support/unlabeled thyroglobulin complexes can be optimized to yield the desired dose response and increase the analytical sensitivity and measuring range.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed:

1. A method of diagnosing an autoimmune thyroid disease in a subject, the method comprising:
    a) diluting a biological sample from the subject to form a diluted biological sample and incubating the diluted biological sample from the subject with:
        a solid support having an unlabeled thyroglobulin bound thereto, wherein the unlabeled thyroglobulin is specifically recognized by an anti-thyroglobulin autoantibody from the subject, wherein the solid support comprises a magnetic bead or a magnetic particle; and
        a chemiluminescent-labeled thyroglobulin comprising a chemiluminescent label bound to a thyroglobulin in at least a 10 times molar excess to the thyroglobulin, wherein the chemiluminescent-labeled thyroglobulin does not bind to the solid support and is specifically recognized by the anti-thyroglobulin autoantibody,
        wherein, in the presence of the anti-thyroglobulin autoantibody, a solid support/chemiluminescent-labeled thyroglobulin complex is formed;
    b) separating with a magnet the solid support/chemiluminescent-labeled thyroglobulin complex from the chemiluminescent-labeled thyroglobulin that is not bound by the anti-thyroglobulin autoantibody; and
    c) detecting the chemiluminescence level of the solid support/chemiluminescent-labeled thyroglobulin complex, wherein the solid support/chemiluminescent-labeled thyroglobulin complex comprises a chemiluminescent label comprising acridinium ester or an analog thereof,
    thereby diagnosing the subject with the autoimmune thyroid disease.

2. The method of claim 1, wherein the magnetic bead or the magnetic particle comprises a paramagnetic particle or a latex magnetic particle.

3. The method of claim 1, wherein the unlabeled thyroglobulin is indirectly bound to the magnetic bead or the magnetic particle.

4. The method of claim 3, wherein the unlabeled thyroglobulin comprises biotin and the magnetic bead or the magnetic particle comprises streptavidin.

5. The method of claim 1, wherein the unlabeled thyroglobulin is directly bound to the solid support.

6. The method of claim 1, wherein the level of the anti-thyroglobulin autoantibody in the biological sample of the subject is directly proportional to the level of the solid support/chemiluminescent-labeled thyroglobulin complex.

7. The method of claim 1, wherein the autoimmune thyroid disease is Graves' disease or Hashimoto's thyroiditis.

8. The method of claim 1, wherein said incubating is performed without washing or separating an unlabeled solid support/anti-thyroglobulin autoantibody complex or a chemiluminescent-labeled thyroglobulin/anti-thyroglobulin autoantibody complex prior to formation of the solid support/chemiluminescent-labeled thyroglobulin complex.

9. The method of claim 1, wherein the chemiluminescent label is bound to the thyroglobulin in at least a 20 times molar excess to the thyroglobulin.

* * * * *